United States Patent [19]
Göckler et al.

[11] Patent Number: 5,530,471
[45] Date of Patent: Jun. 25, 1996

[54] RADIO AND TELEVISION DISTRIBUTION SYSTEM

[75] Inventors: Heinz Göckler, Backnang; Karlheinz Grotz, Fellbach; Georg Süssmeier, Backnang, all of Germany

[73] Assignee: ANT Nachrichtentechnik GmbH, Backnang, Germany

[21] Appl. No.: 330,813

[22] Filed: Oct. 24, 1994

[30] Foreign Application Priority Data

Oct. 30, 1993 [DE] Germany ............... 43 37 138.8

[51] Int. Cl.$^6$ ..................... H04N 7/22
[52] U.S. Cl. .............. 348/6; 370/55; 370/69.1; 359/115; 359/125
[58] Field of Search ............ 348/7, 6, 9, 10, 348/11; 375/257; 359/109, 113, 114, 115, 123, 124, 125, 117, 135, 136, 137; 455/3.1, 4.1, 4.2, 6.1, 6.2; 370/55, 69.1, 123, 71, 72, 73; 380/10, 13; H04N 7/10, 5/268, 7/16, 7/173, 7/22

[56] References Cited

U.S. PATENT DOCUMENTS

| | | | |
|---|---|---|---|
| 4,771,456 | 9/1988 | Martin et al. | 348/11 |
| 4,864,613 | 9/1989 | Van Cleave. | |
| 4,989,199 | 1/1991 | Rzeszewski | 359/123 |
| 5,461,612 | 10/1995 | Göckler et al. | 370/55 |

FOREIGN PATENT DOCUMENTS

| | | | |
|---|---|---|---|
| 0633698 | 1/1995 | European Pat. Off. | H04N 7/22 |
| 4008201C2 | 3/1992 | Germany. | |
| 0017776 | 1/1990 | Japan | H04N 7/10 |
| 0161141 | 6/1993 | Japan | H04N 7/22 |

OTHER PUBLICATIONS

Terry, J "Alternative Technologies and Delivery Systems for Broadband ISDN Access" IEEE Communications Magazine, Aug. 1992.
Grant, William, *Cable Television*, Reston Publishing Company, 1983, pp. 227–229.
Slater, J. N., *Calbe Television Technology*, Ellis Horwood Limited, 1988, pp. 30–37.

*Primary Examiner*—David E. Harvey
*Attorney, Agent, or Firm*—Spencer & Frank

[57] ABSTRACT

A distribution system, useful with radio and television distribution, for distributing a signal having a plurality of channels includes a central station. The central station produces a first frequency division multiplexed signal in which signals from a plurality of channels or channel groups are frequency-converted and combined, and introduces the first frequency division multiplexed signal into transmission media of the distribution system. The first frequency division multiplexed signal may include occupied channels, freely selectable occupied channels, and free channels. A plurality of further stations receive the first frequency division multiplexed signal from the central station and process it with signals of a plurality of further channels to produce a second frequency division multiplexed signal. The signals of the plurality of further channels may be put in free channels, or used to replace signals in freely selectable occupied channels of the first frequency division multiplexed signal. A plurality of user devices receive the second frequency division multiplexed signal from at least one of the plurality of further stations, and split it into individual channel or channel group signals for user access.

19 Claims, 8 Drawing Sheets

DDFU (DECIMATING DIGITAL FREQUENCY CONVERTER)
IDFU (INTERPOLATING DIGITAL FREQUENCY CONVERTER)
EKBF (SINGLE CHANNEL BAND FILTER)
DAMUX (DROP-ADD MULTIPLEXER)

DDFU (DECIMATING DIGITAL FREQUENCY CONVERTER)
IDFU (INTERPOLATING DIGITAL FREQUENCY CONVERTER)

RADIO AND TELEVISION DISTRIBUTION SYSTEM

CROSS REFERENCE TO RELATED APPLICATION

This application claims the priority of German Application No. P 43 37 138.8 filed Oct. 30, 1993, which is hereby incorporated herein by reference.

BACKGROUND OF THE INVENTION

1. Field of the Invention

The invention relates to a distribution system for the distribution of a frequency division multiplexed (FDM) signal with a plurality of channels from a central station in which signals from channels or groups of channels are frequency-converted and combined, to user devices in which the FDM signal is broken up or processed into individual channels or channel groups for user access, for use with radio and television signals, for example.

2. Background Information

A method for processing several television signals for the purpose of transmission and post-processing at the receiving end, in particular for a distribution system, and its use in a distribution system, is known from German Patent 40 08 201. In this disclosure, components for a distribution system have been introduced. However, a concrete and practically usable realization of a system with a favorable outlay for complete distribution systems is not disclosed.

SUMMARY OF THE INVENTION

It is therefore an object of the present invention to provide a distribution system of the type mentioned at the outset which represents the concrete and practically usable realization of a system with a favorable outlay. In the process, the optimal supply of an area, as well as good signal quality, is to be attained or maintained by a universal use of digital signal processing.

This object is attained by a distribution system for distribution of a frequency division multiplexed (FDM) signal with a large number of channels from a central station. In the central station, signals from a plurality of (M) channels or groups of channels are frequency-converted and are combined into a first FDM signal which is introduced into the system. Further stations Si are provided in the system for processing the incoming first FDM signal so that the signals of a plurality (Ni) of further channels can be included in a new (second) FDM signal. The further signals are placed in free frequency channels, or in the place of signals in freely selectable occupied channels. A plurality of user devices break up or process the new FDM signal into individual channel or channel group signals for user access.

In one embodiment, the distribution system is configured as one of a network system, a star system, or a combination of a network system and a star system.

Advantageously, a respective drop-add multiplexer (DAMUX) is provided in the further stations for receiving the signals of further channels. The drop-add multiplexer (DAMUX) filters the incoming first FDM signal so that desired channels are allowed to go through and channels to be kept free or to be replaced, are blocked. The signals of further channels ($s_1$, $s_2$) to be received are converted into free frequency ranges ($f_1$, $f_2$) provided for them and, following filtering, are added to the filtered incoming first FDM signal. This summed signal is the new (second) FDM signal.

In a further embodiment, the FDM signal undergoes a multiplication by the factor $\gamma<1$ in one or more of the further stations.

In a preferred embodiment, a digital frequency multiplex converter is provided at least in the central station for frequency conversion and combination of the signals of the channels or channel groups. In a first stage, the signals of the channels or channel groups, which have been scanned at a uniform scanning rate and digitized, are respectively frequency-converted along with an increase of the scanning rate by a factor $LN \geq 2$ or $LM \geq 2$ in interpolating digital frequency converters, and are combined by means of a complex adder. A plurality of signals frequency-converted and combined in this way may be produced. The frequency-converted signals, combined by means of the complex adder, have complex values. The signals with complex values are frequency-converted in a second stage by means of complex group band filters having coefficients of complex value, with a further increase of the scanning rate, and are converted into real signals, which are combined by means of a real adder to produce the first FDM signal.

Further advantageous embodiments are described in the detailed description section and defined in the claims.

The distribution system of the invention represents the concrete and practically usable realization of a system concept with a favorable outlay, for use in a radio and television distribution system, for example. The distribution system makes possible optimal coverage of an area and maintenance of good signal quality by a universal use of digital signal processing. Furthermore, the distribution system has a high degree of flexibility and configuration options. Local exchange of selected programs is made almost arbitrarily possible at any point of the distribution system.

BRIEF DESCRIPTION OF THE DRAWINGS

The above and other features and advantages of embodiments of the invention will become apparent from the following detailed description taken with the drawings in which.

DETAILED DESCRIPTION OF THE REFERRED EMBODIMENTS

The following detailed description of the preferred embodiments is presented by way of example, and should not be construed as strictly limiting the invention to the particular structure disclosed. There may be various modifications and equivalents which are considered to be within the scope of the invention as defined by the claims.

Figure 1:
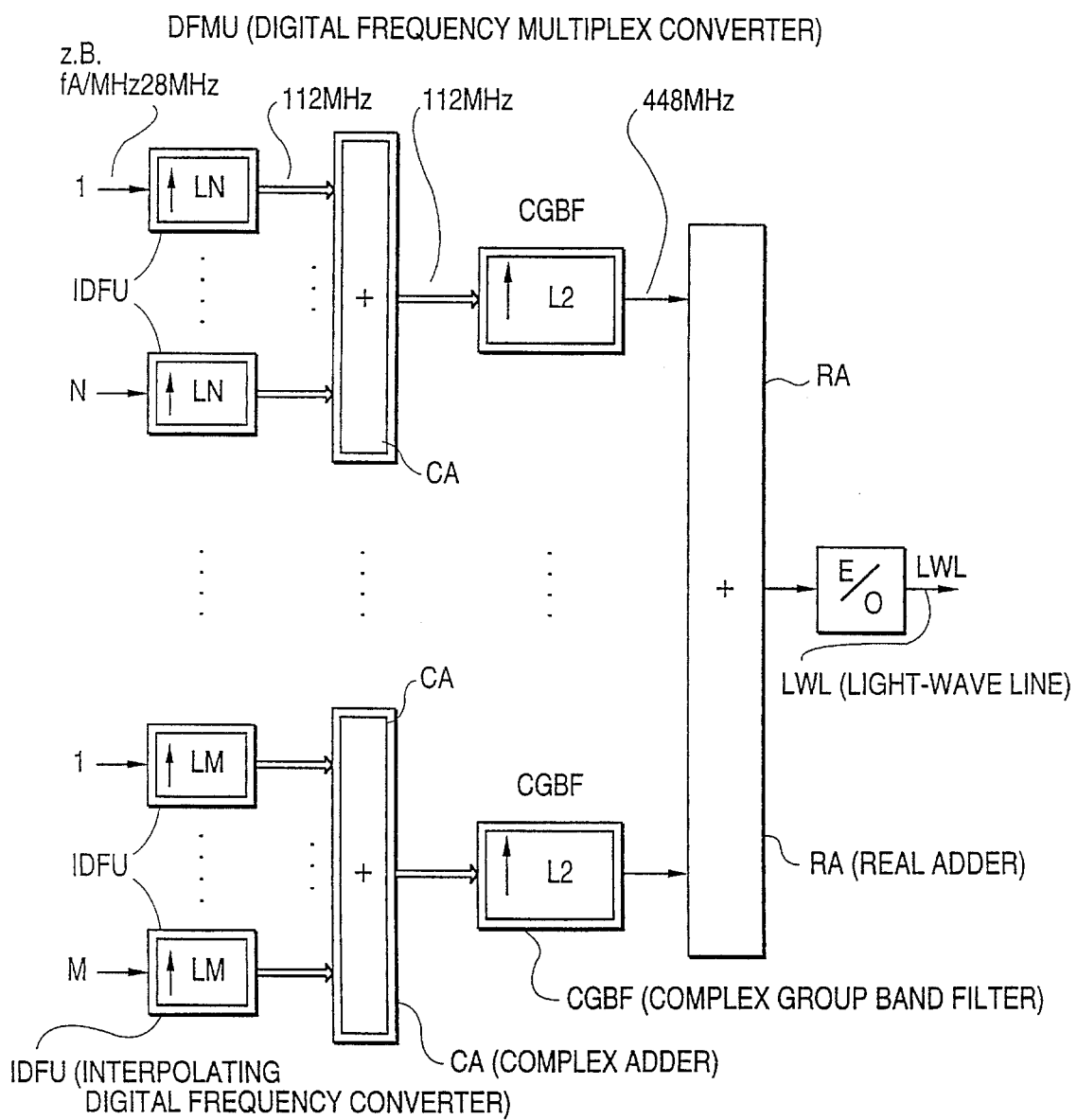
FIG. 1, in conjuction with FIG. 1a, illustrates an arrangement in accordance with the invention of a digital frequency multiplex converter used in the central station of, for example, a fiber optic distribution system in accordance with the exemplary embodiments of FIGS. 2 and 3.

FIG. 1 shows a digital frequency multiplex converter (DFMU). As illustrated in a first branch (upper part of figure), a first group of 1 to N channels is converted by means of interpolating digital frequency converter IDFU to increase the scanning rate, for example from 28 MHz to 112 MHz, i.e., by a factor LN=4, and being subsequently combined by means of complex adder CA.

This combined signal from complex adder CA is subsequently provided to complex group band filter CGBF, which filters with an increase of the scanning rate, for example to 448 MHz, i.e. by the factor L2=4.

The above also takes place in a lower branch in connection with another group of M channels, wherein the initial scanning frequency is increased by the factor LM (≠ or=LN) to the same value (112 MHz in the example). As illustrated by the intervening dots between the upper and lower branches, further similar branches may be present.

The output signals of the individual complex group band filters (CGBF) are combined by means of real adder RA into a first frequency division multiplexed (FDM) signal which, in the illustrated embodiment, following an electro-optical conversion (E/O), is transmitted to the rest of the distribution system via a light wave line (LWL), i.e., fiber optic wave guide.

Figure 1A:
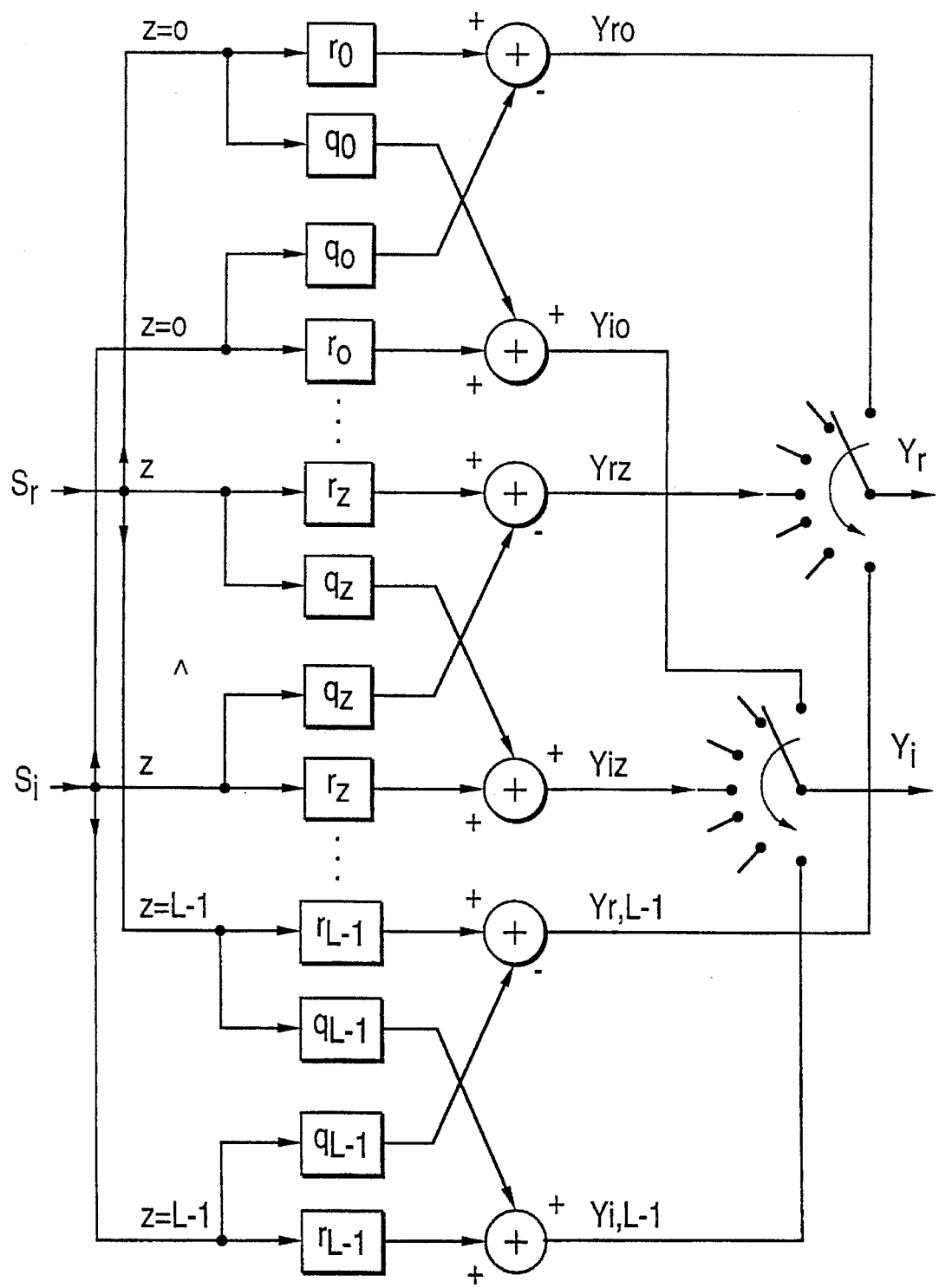
FIG. 1a illustrates the realization of a poly-phase filter system for complex input and output signals with a general branched filter structure.

FIG. 1a shows an exemplary realization of a poly-phase filter system for complex input and output signals with a general branched filter structure, which has the advantage that the arithmetic operations take place at the low scanning rate and that only a minimum number of multiplexers are required for the temporal interlacing of the partial signals for increasing the scanning frequency by the factor L.

In a combination of FIG. 1 with FIG. 1a, a pair of time multiplexers (for the temporal interlacing) is required for each IDFU, and the operation of complex adding CA must be performed at the increased scanning rate of 112 MHz. Correspondingly, a time multiplexer is required for complex each group band filter (CGBF), and the operation of real adding (RA) is performed at the scanning rate of 448 MHz, additionally increased by L2.

Figure 1B:
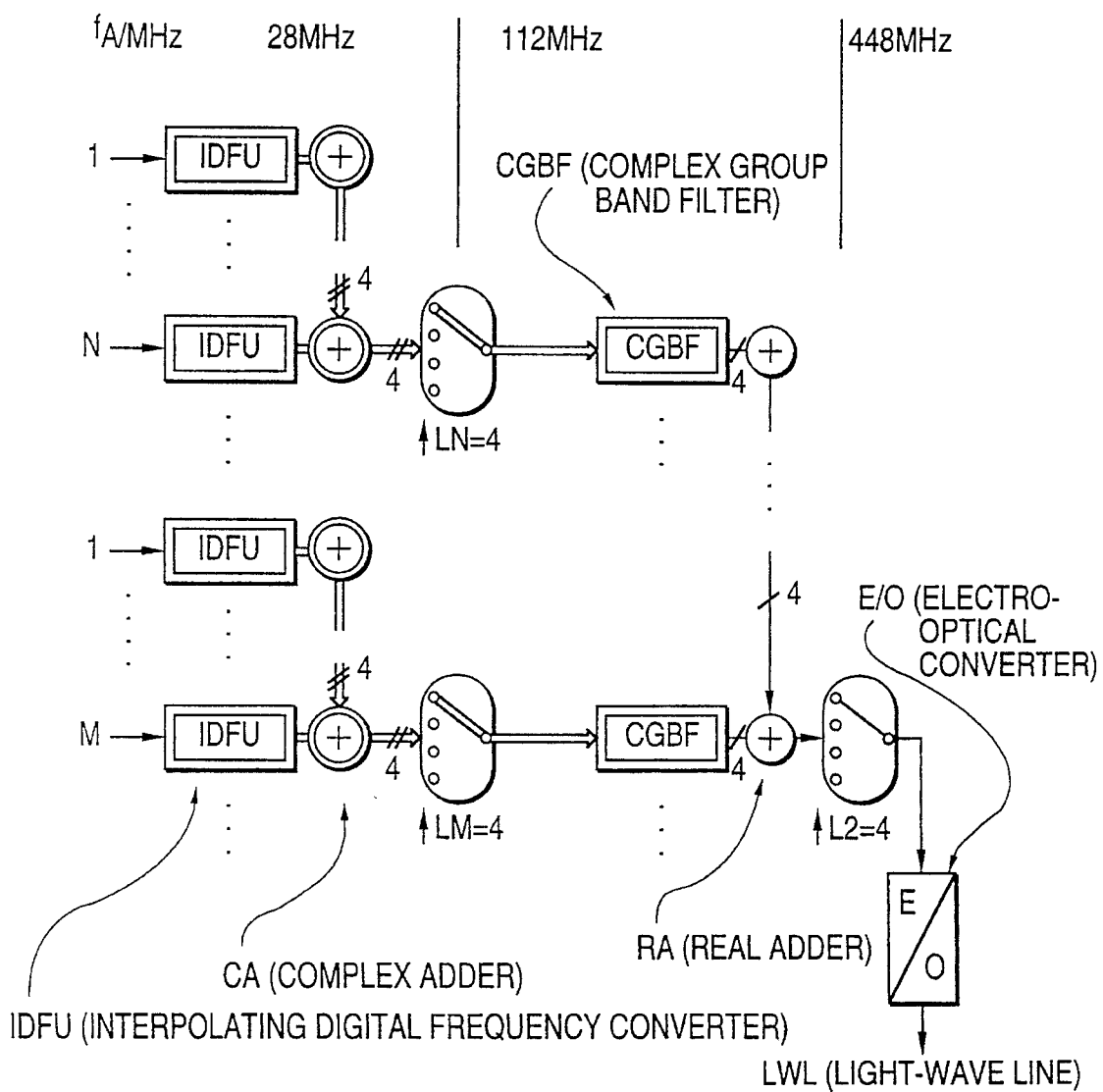
FIG. 1b illustrates an alternate embodiment of a digital frequency multiplex converter used in a central station.

The embodiment illustrated in FIG. 1b provides relief. Here, in contrast to FIG. 1, in a first stage, the operation of complex adding (CA) has been pulled down via the associated multiplexer to the respectively lower, i.e., not yet increased, scanning frequency. This applies to all interpolating digital frequency converters (IDFU's) belonging to a group N or M. The complex addition was divided into a number N or M (N−1, M−1) of duplex adders for each of the eight (4×2) individual lines here.

The same steps were also used in a second stage having group band filters CGBF. The increase in the scanning rate by L2=4 takes place here after the addition as well.

Figure 2:
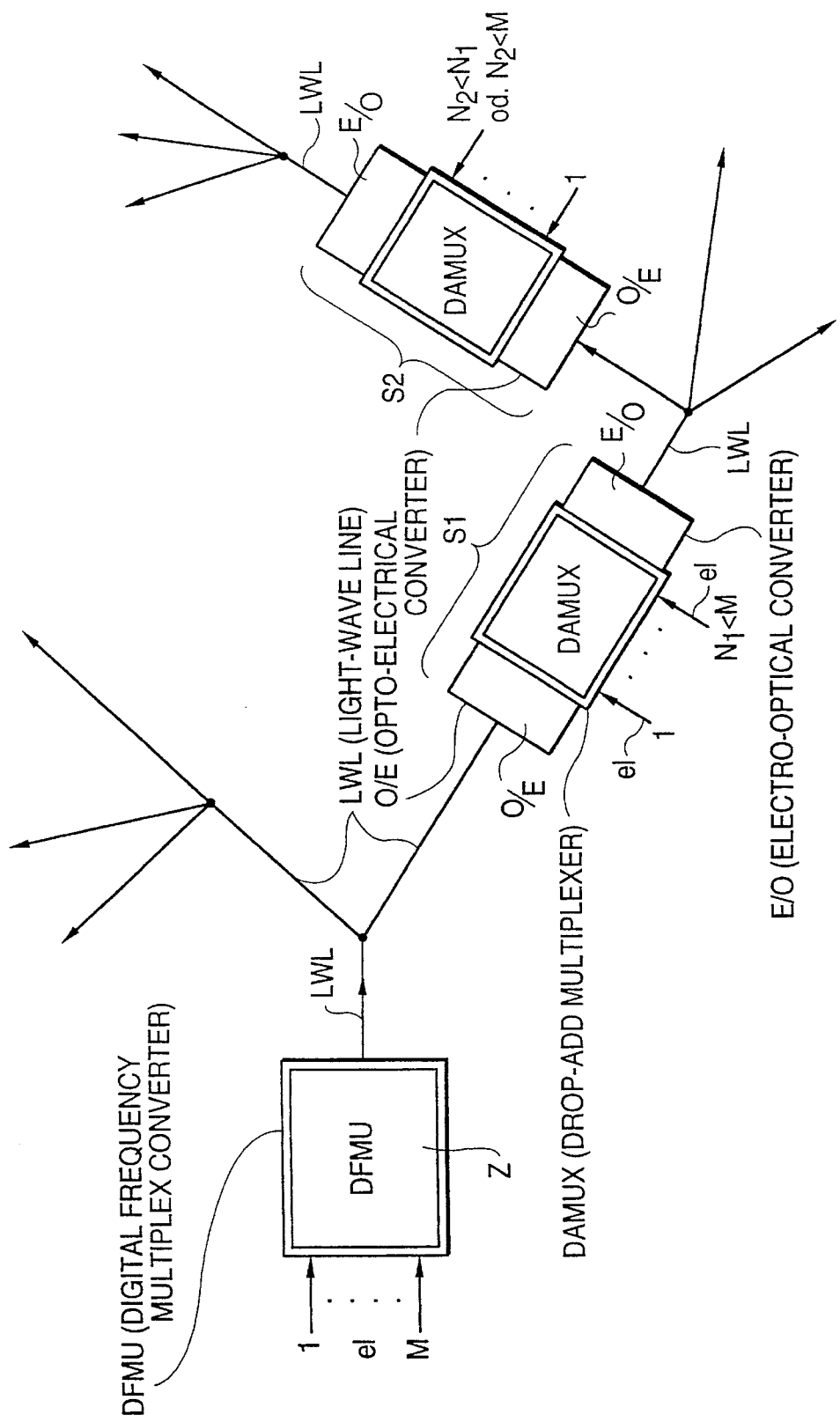
FIG. 2 shows an exemplary branched structure of the distribution system.

FIG. 2 shows a branched structure of the distribution system by way of example. A central station Z with digital frequency multiplex converter DFMU is illustrated on the left, which frequency-converts M channels and combines them into a first FDM signal, which is transmitted via an electro-optical converter to the optical fiber system, light wave line LWL.

At the further stations S1 and S2 along the optical fiber (LWL), a drop-add multiplexer DAMUX has been inserted between an opto-electrical and electro-optical converter. The drop-add multiplexer, for example, feeds in new channels into gaps (free frequency channels), eliminates undesired channels or programs and, if desired, replaces them with other ones. In this way it is possible to a large extent to meet any local program requests. In the exemplary embodiment, at station S1, a number $N_1 < M$ of new channels are fed in with the drop-add multiplexer, and at the station S2, a number $N_2 < N_1$ or $<M$ of new channels are fed in.

Figure 3:
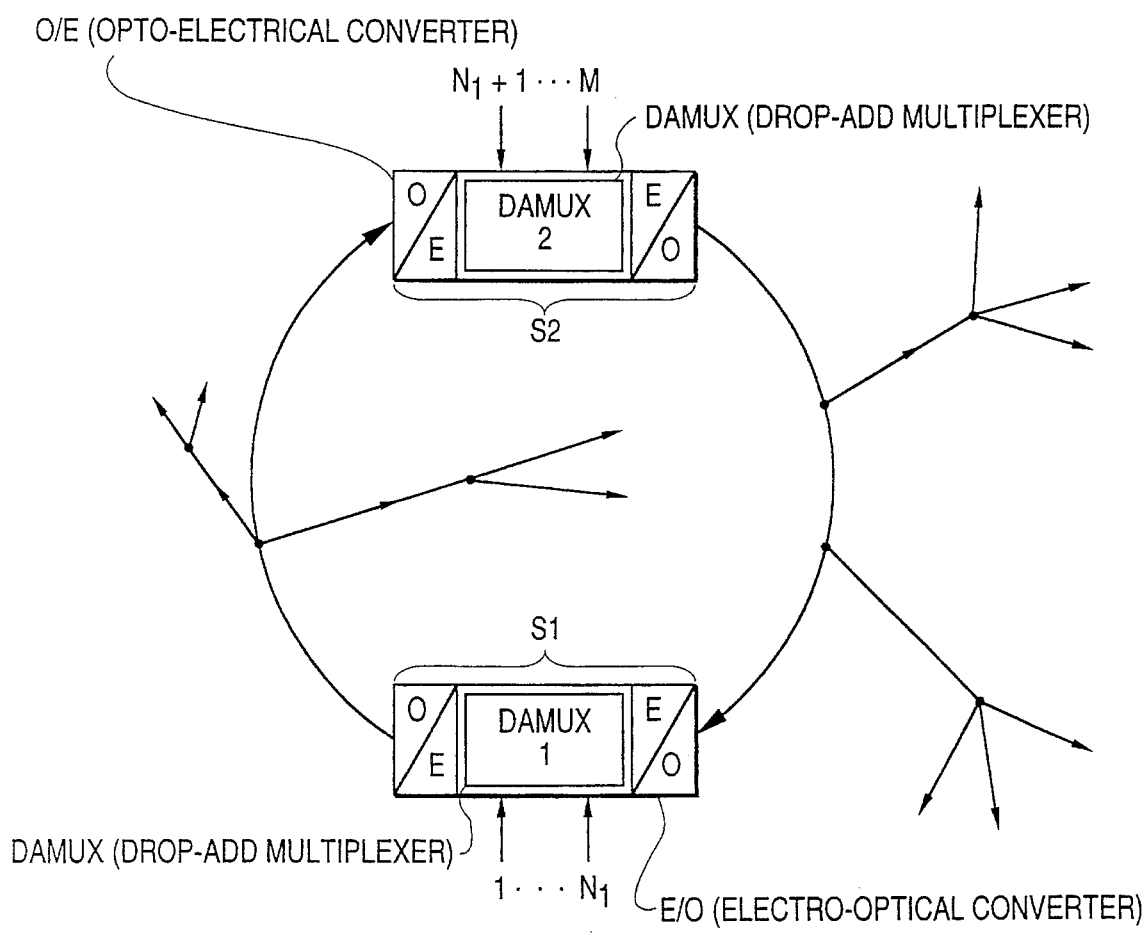
FIG. 3 illustrates an exemplary flexible and fully available circular distribution system.

FIG. 3 shows a flexible, fully available circular distribution system with two stations S1 and S2, which in addition is branched into a branch structure. In the same way as in the distribution system of FIG. 2, a drop-add multiplexer DAMUX has been inserted at the two stations respectively between opto-electric and electro-optical converters. $N_1$ programs are fed in with the DAMUX 1 of station S1, while DAMUX 2 in station 2 lets these channels through unhindered. This applies correspondingly to the programs ($N_1+1$ to M) fed in with DAMUX 2 into the channels not occupied by DAMUX 1, for which DAMUX 1 is transparent. In this way all programs fed in at any point in the circle can be picked up at every point in the circle.

Figure 4:
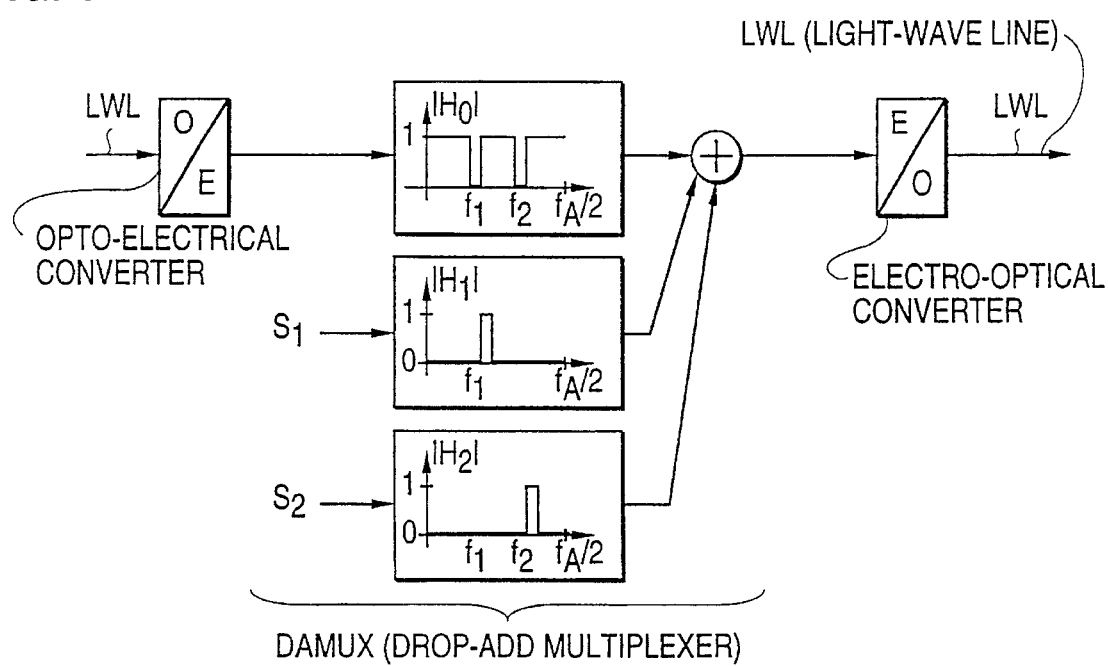
FIG. 4 illustrates the basic functions of a drop/add multiplexer.

FIG. 4 serves to illustrate the basic functions of a drop-add multiplexer (DAMUX). A level of "1" indicates a signal is passed, while a level of "0" indicates the signal is blocked. At the left of the figure, an FDM signal is received over a fiber optic light wave line (LWL) and optical-to-electric converted (O/E) before being provided to the DAMUX. The DAMUX is transparent (level "1") for all channels on the incoming FDM signal which are not to be replaced thereby, which for the DAMUX in FIG. 4, are all channels except f1 and f2. Incoming channels f1 and f2 are filtered, i.e., blocked (level "0"). The signals $s_1$ of a first channel and the signals $s_2$ of a second channel to be fed in by the DAMUX are converted by the DAMUX to the corresponding frequency places $f_1$ or $f_2$, and are subsequently combined via a summing element with the transparently transmitted signals of the upper branch, to produce a new FDM signal, which is then transmitted via an electro-optical converter (E/O) to the optical fiber light wave line (LWL) at the right of the figure.

If, in accordance with FIG. 3, the DAMUX of FIG. 4 is fed back via an optical fiber circle, it is possible that the system may become unstable, because in wide frequency ranges the loop damping has the value 0 db (loop amplification v0=1). Therefore, quantization noise which is always present in these undamped frequency ranges is amplified to infinity by means of the loop transmission function $H_s = 1/(1-v0)$. Even when employing a plurality of DAMUX's in the circle, it cannot be generally assumed that all channels are occupied by programs, since only in these channels is the loop amplification <<1.

One solution to this peripheral problem consists in inserting a digital multiplication by a factor $\gamma < 1$ in the electrical path, at least in one DAMUX. $\gamma$ should be selected such that at defined pick-up points, the levels of the channel signals are as little different from each other as possible.

If, for example, a digital multiplexer $\gamma$ is used in the DAMUX 1 of FIG. 3, all signals in the left half of the circle have the same level, while in the right half of the circle, only the signals of the DAMUX 1 are valued by $\gamma$, but not the signals of the DAMUX 2. The amplitude difference $= 20 \lg \gamma$.

On the other hand, should be as close as possible to zero in order not to amplify the noise in the unoccupied channels, and a γ less than approximately 0.5 is considered to be sufficient. A multiplication with 0.5, 0.75 or 0.875 is considered favorable for realization and can be performed with few shifts and additions.

Figure 5:
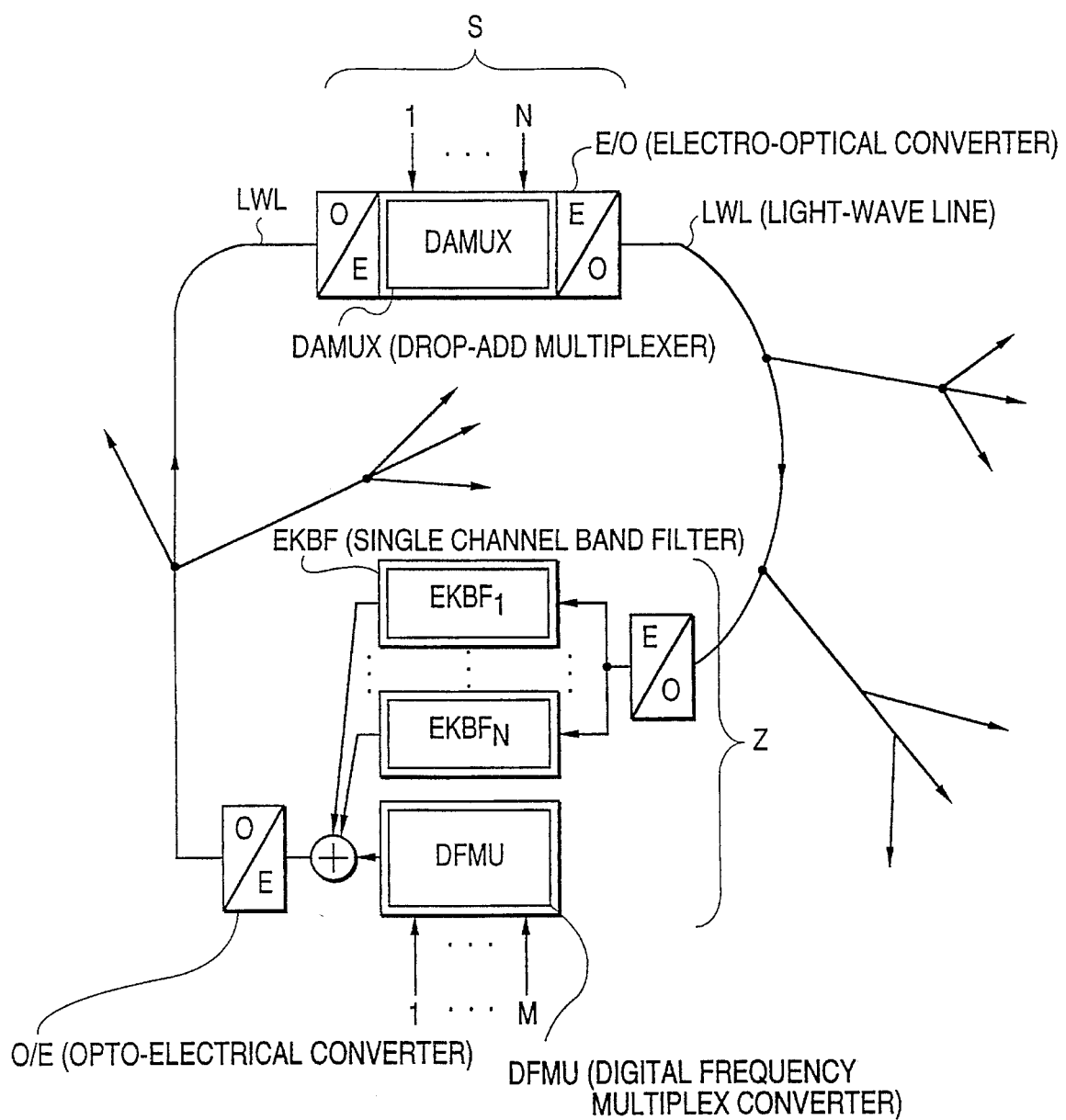
FIG. 5 hows a circular distribution structure which avoids stability problems.

However, the stabilization problem can be completely eliminated by means of the circle structure of FIG. 5 without impairing the flexibility and availability of the system.

The largest number of programs to be fed in occurs at the central station Z. Feeding is advantageously performed by means of a digital frequency multiplex converter DFMU, which converts M channels and feeds them into the circle, but which itself is not a part of the circle structure. The circle is closed for N channels to be fed in via a DAMUX of the station S, and via N single channel band filters $EKBF_1$ to $EKBF_N$ at the central station Z, which respectively are only transparent for the individual channels around $f_1$ to $f_N$. The output signals of the N single channel band filters $EKBF_1$ to $EKBFN_N$, via a summing element into which the M channels from the DFMU are also fed, results in the FDM signal of the left half of the circle.

However, the DAMUX of station S blocks exactly in the frequency ranges $f_1$ to $f_N$. In this way, the loop amplification in the entire frequency band of the circle of FIG. 5 is low in the direction of 1, because of which basically no instabilities can occur. This also applies when a plurality of DAMUX's have been arranged in the circle.

Figure 6A:
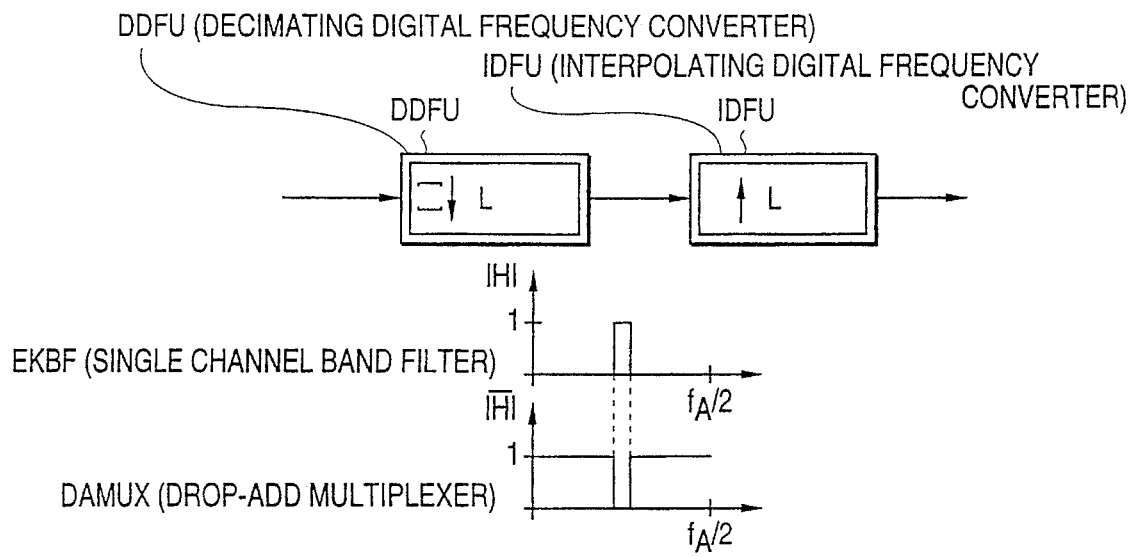
FIGS. 6a and 6b illustrate advantageous exemplary embodiments of single channel band filters and their employment in a drop-add multiplexer.
Figure 6B:
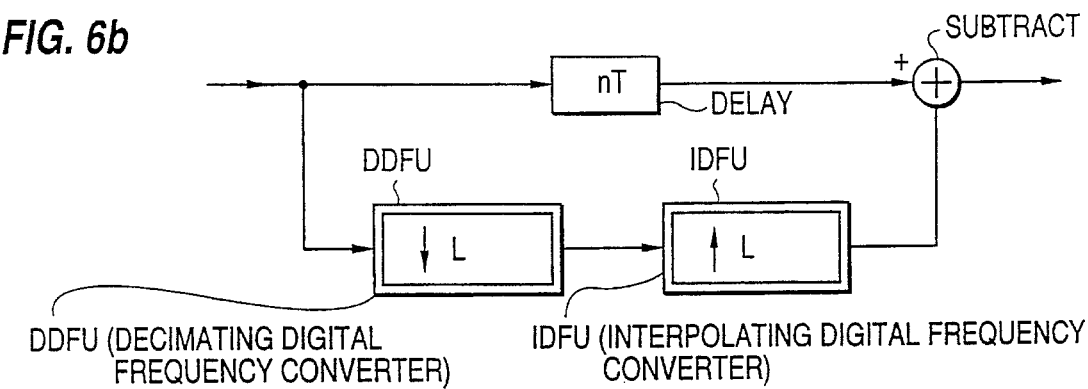

The arrangement in accordance with FIG. 6a offers an efficient realization with a favorable outlay of the single channel band filter EKBF, wherein decimating digital frequency converter DDFU is cascaded with interpolating digital frequency converter IDFU. The transmission function (|H|) has been drawn underneath which shows a transparency only for the channel frequency fi. The transmission function of a DAMUX, which is complementary to the transmission function |H|, has been drawn underneath this, which lets all channels through undamped, but blocks the channel of the frequency fi. This is achieved in that the transmission function of the single channel band filter EKBF is subtracted from the incoming FDM signal. To compensate for the passage time through the single channel band filter, the incoming FDM signal is delayed prior to forming the difference by a corresponding amount of passage time n·T.

It will be understood that the above description of the present invention is susceptible to various modifications, changes, and adaptations, and the same are intended to be comprehended within the meaning and range of equivalents of the appended claims.

For example, a modification of the embodiment of the circle structures of FIG. 3 or 5 consists of placing two optical fibers in the circle in place of the one optical fiber LWL. In case of an unintended cutting of one of the optical fibers at one point, caused for example by construction work, there is a possibility of continuing to provide all places with all programs by appropriate feeding-in via DFMU or DAMUX into the still present optical fiber pieces and by their appropriate connection.

Further, a corresponding system can be constructed in the same way with coaxial cables if the light wave line (LWL) is replaced by corresponding cables. Of course, in that case, all E/O and O/E blocks are omitted.

Regarding transmission of the FDM signal, the described embodiments employed transmission of a digitized FDM signal. However, if the E/O blocks are replaced by D/A converters and the O/E blocks by A/D converters, cable transmission takes place in an analog manner, while signal processing continues to be performed digitally with all advantages, such as improved signal quality, reproducability, great flexibility (also via remote control), etc.

What is claimed is:

1. A distribution system, for use with radio and television distribution, for distributing a signal having a plurality of channels, comprising:

a central station for producing a first frequency division multiplexed signal in which signals from a plurality of channels or channel groups are frequency-converted and combined, and for introducing the first frequency division multiplexed signal into transmission media of the distribution system, wherein the first frequency division multiplexed signal includes occupied channels, freely selectable occupied channels, and free channels;

a plurality of further stations for receiving the first frequency division multiplexed signal from the central station and for processing the received first frequency division multiplexed signal, wherein signals of a plurality of further channels are processed with the first frequency division multiplexed signal to produce a second frequency division multiplexed signal, the signals of the plurality of further channels being put in free channels, or replacing signals in freely selectable occupied channels of the first frequency division multiplexed signal; and a plurality of user devices in which the second frequency division multiplexed signal is received from at least one of the plurality of further stations, and split into individual channel or channel group signals for user access;

wherein the distribution system is configured as one of:
a network system,
a star system, or
a combination of a network system and a star system; and wherein each of the further stations comprises a respective drop-add multiplexer, the drop-add multiplexer for:
receiving signals of the further channels,
receiving and filtering the first frequency division multiplexed signal so that desired channels are passed, and so that free channels to be kept free, and freely selectable occupied channels to be replaced, are blocked,
converting the signals of the further channels into selected free frequency ranges,
adding the converted signals of the further channels to the filtered first frequency division multiplexed signal, and
outputting a summed signal as the second frequency division multiplexed signal.

2. A distribution system in accordance with claim 1, wherein the first frequency division multiplexed signal undergoes a multiplication by a factor γ<1 in one or more of the further stations.

3. A distribution system in accordance with claim 2, wherein the central station includes a digital frequency multiplex converter for frequency converting and combining the signals of the channels or channel groups, the digital frequency multiplex converter comprising a respective first stage for each of the respective channels or channel groups and a second stage;

wherein each respective first stage includes:
a plurality of interpolating digital frequency converters wherein the signals of the respective channels or channel groups are scanned at a uniform scanning rate and frequency-converted;

a complex adder for combining the frequency-converted signals from the plurality of interpolating digital frequency converters, wherein the frequency-converted signals, combined by means of the adder, have complex values; and first means for increasing the scanning rate by a first factor L; and wherein the second stage includes:

a respective group band filter for each respective first stage, wherein the signals with complex values are frequency-converted and converted into real signals, the group band filters having coefficients of complex value;

a real adder for combining the real signals from the respective group band filters; and second means for increasing the scanning rate by a second factor L;

wherein the first frequency division multiplexed signal is output by the second stage.

4. A distribution system in accordance with claim 3, wherein the respective first and second means for increasing the scanning rate, increase the scanning rate following the respective addition operation.

5. A distribution system in accordance with claim 3, wherein the distribution system is in the form of a circle with an incoming and an outgoing side with respect to the central station;

wherein by means of the digital frequency multiplex converter provided in the central station, signals of the plurality of channels or channel groups with frequencies $f_1$ to $f_M$ are frequency-converted and combined;

wherein the central station further comprises N single channel band filters transparent for single channels with the respective frequencies $f_M+1$ to $f_M+M$, and to which a frequency division multiplexed signal received from the incoming side is fed;

wherein the central station further comprises adding means for adding output signals from the N single channel band filters to output signal of the digital frequency multiplex converter; and wherein a summed signal is output by the adding means and fed to the outgoing side of the distribution system with respect to the central station as an outgoing frequency division multiplexed signal.

6. A distribution system in accordance with claim 5, wherein each of the N single channel band filters comprises a cascade connection of a decimating digital frequency converter and a subsequent interpolating digital frequency converter.

7. A distribution system in accordance with claim 6, wherein respective drop-add multiplexers of the further stations comprise single channel band filters for blocking individual channels;

wherein the single channel band filters of the further stations are fed respectively by an incoming frequency division multiplexed signal; and wherein the further stations further comprise subtracting means for subtracting output signals of the single channel band filters of the further stations from the respective incoming frequency division multiplexed signal and outputting a difference as a respective outgoing frequency division multiplexed signal.

8. A distribution system in accordance with claim 7, wherein the respective drop-add multiplexers of the further stations further comprise delay means for compensation of a running time of the single channel band filters by delaying the incoming frequency division multiplexed signal by the same amount of running time after being fed into the individual single channel band filters and before being fed to the subtracting means.

9. A distribution system in accordance with claim 8, wherein electro-optical transmitters and opto-electrical receivers are provided in the central station and the further stations for converting the frequency division multiplexed signal to and from an optical signal, and wherein optical fibers are provided for transmitting the optical signal between stations.

10. A distribution system in accordance with claim 9, wherein digital-to-analog and analog-to-digital converters are provided in the central station and the further stations for converting the frequency division multiplexed signal to and from an analog signal, and providing for analog transmission between stations of the frequency division multiplexed signal.

11. A distribution system in accordance with claim 10, wherein the respective first and second means for increasing the scanning rate, increase the scanning rate following the respective addition operation.

12. A distribution system, for use with radio and television distribution, for distributing a signal having a plurality of channels, comprising:

a central station for producing a first frequency division multiplexed signal in which signals from a plurality of channels or channel groups are frequency-converted and combined, and for introducing the first frequency division multiplexed signal into transmission media of the distribution system, wherein the first frequency division multiplexed signal includes occupied channels, freely selectable occupied channels, and free channels;

a plurality of further stations for receiving the first frequency division multiplexed signal from the central station and for processing the received first frequency division multiplexed signal, wherein signals of a plurality of further channels are processed with the first frequency division multiplexed signal to produce a second frequency division multiplexed signal, the signals of the plurality of further channels being put in free channels, or replacing signals in freely selectable occupied channels of the first frequency division multiplexed signal; and a plurality of user devices in which the second frequency division multiplexed signal is received from at least one of the plurality of further stations, and split into individual channel or channel group signals for user access;

wherein each of the further stations comprises a respective drop-add multiplexer, the drop-add multiplexer for:

receiving signals of the further channels, receiving and filtering the first frequency division multiplexed signal so that desired channels are passed, and so that free channels to be kept free, and freely selectable occupied channels to be replaced, are blocked, converting the signals of the further channels into selected free frequency ranges, adding the converted signals of the further channels to the filtered first frequency division multiplexed signal, and outputting a summed signal as the second frequency division multiplexed signal; and wherein the central station includes a digital frequency multiplex converter for frequency converting and combining the signals of the channels or channel groups, the digital frequency multiple converter comprising a respective first stage for each of the respective channels or channel groups and a second stage;

wherein each respective first stage includes:

a plurality of interpolating digital frequency converters wherein the signals of the respective channels or channel groups are scanned at a uniform scanning rate and frequency-converted;

a complex adder for combining the frequency-converted signals from the plurality of interpolating digital frequency converters, wherein the frequency-converted signals, combined by means of the adder, have complex values; and first means for increasing the scanning rate by a first factor L; and wherein the second stage includes:

a respective group band filter for each respective first stage, wherein the signals with complex values are frequency-converted and converted into real signals, the group band filters having coefficients of complex value;

a real adder for combining the real signals from the respective group band filters; and second means for increasing the scanning rate by a second factor L;

wherein the first frequency division multiplexed signal is output by the second stage.

13. A distribution system in accordance with claim 12, wherein the distribution system is in the form of a circle with an incoming and an outgoing side with respect to the central station;

wherein by means of the digital frequency multiplex converter provided in the central station, signals of the plurality of channels or channel groups with frequencies $f_1$ to $f_M$ are frequency-converted and combined;

wherein the central station further comprises N single channel band filters transparent for single channels with the respective frequencies $f_M+1$ to $f_M+M$, and to which a frequency division multiplexed signal received from the incoming side is fed;

wherein the central station further comprises adding means for adding output signals from the N single channel band filters to output signal of the digital frequency multiplex converter; and wherein a summed signal is output by the adding means and fed to the outgoing side of the distribution system with respect to the central station.

14. A distribution system in accordance with claim 13, wherein each of the N single channel band filters comprises a cascade connection of a decimating digital frequency converter and a subsequent interpolating digital frequency converter.

15. A distribution system, for use with radio and television distribution, for distributing a signal having a plurality of channels, comprising:

a central station for producing a first frequency division multiplexed signal in which signals from a plurality of channels or channel groups are frequency-converted and combined, and for introducing the first frequency division multiplexed signal into transmission media of the distribution system, wherein the first frequency division multiplexed signal includes occupied channels, freely selectable occupied channels, and free channels;

a plurality of further stations for receiving the first frequency division multiplexed signal from the central station and for processing the received first frequency division multiplexed signal, wherein signals of a plurality of further channels are processed with the first frequency division multiplexed signal to produce a second frequency division multiplexed signal, the signals of the plurality of further channels being put in free channels, or replacing signals in freely selectable occupied channels of the first frequency division multiplexed signal; and a plurality of user devices in which the second frequency division multiplexed signal is received from at least one of the plurality of further stations, and split into individual channel or channel group signals for user access;

wherein each of the further stations comprises a respective drop-add multiplexer, the drop-add multiplexer for:

receiving signals of the further channels, receiving and filtering the first frequency division multiplexed signal so that desired channels are passed, and so that free channels to be kept free, and freely selectable occupied channels to be replaced, are blocked converting the signals of the further channels into selected free frequency ranges, adding the converted signals of the further channels to the filtered first frequency division multiplexed signal, and outputting a summed signal as the second frequency division multiplexed signal; and wherein respective drop-add multiplexers of the further stations comprise single channel band filters for blocking individual channels;

wherein the single channel band filters of the further stations are fed respectively by an incoming frequency division multiplexed signal; and wherein the further stations further comprise subtracting means for subtracting output signals of the single channel band filters of the further stations from the respective incoming frequency division multiplexed signal and outputting a difference as a respective outgoing frequency division multiplexed signal.

16. A distribution system in accordance with claim 15, wherein the respective drop-add multiplexers of the further stations further comprise delay means for compensation of a running time of the single channel band filters by delaying the incoming frequency division multiplexed signal by the same amount of running time after being fed into the individual single channel band filters and before being fed to the subtracting means.

17. A distribution system in accordance with claim 1, wherein electro-optical transmitters and opto-electrical receivers are provided in the central station and the further stations for converting the frequency division multiplexed signal to and from an optical signal, and wherein optical fibers are provided for transmitting the optical signal between stations.

18. A distribution system in accordance with claim 12, wherein electro-optical transmitters and opto-electrical receivers are provided in the central station and the further stations for converting the frequency division multiplexed signal to and from an optical signal, and transmitting the optical signal between stations via optical fibers.

19. A distribution system in accordance with claim 15, wherein electro-optical transmitters and opto-electrical receivers are provided in the central station and the further stations for converting the frequency division multiplexed signal to and from an optical signal, and transmitting the optical signal between stations via optical fibers.

* * * * *